SWITCHING SYSTEM FOR SWITCHING THE OPERATING MODES
OF AN AMPLIFIER FOR RECORDING APPARATUS
Filed June 9, 1965
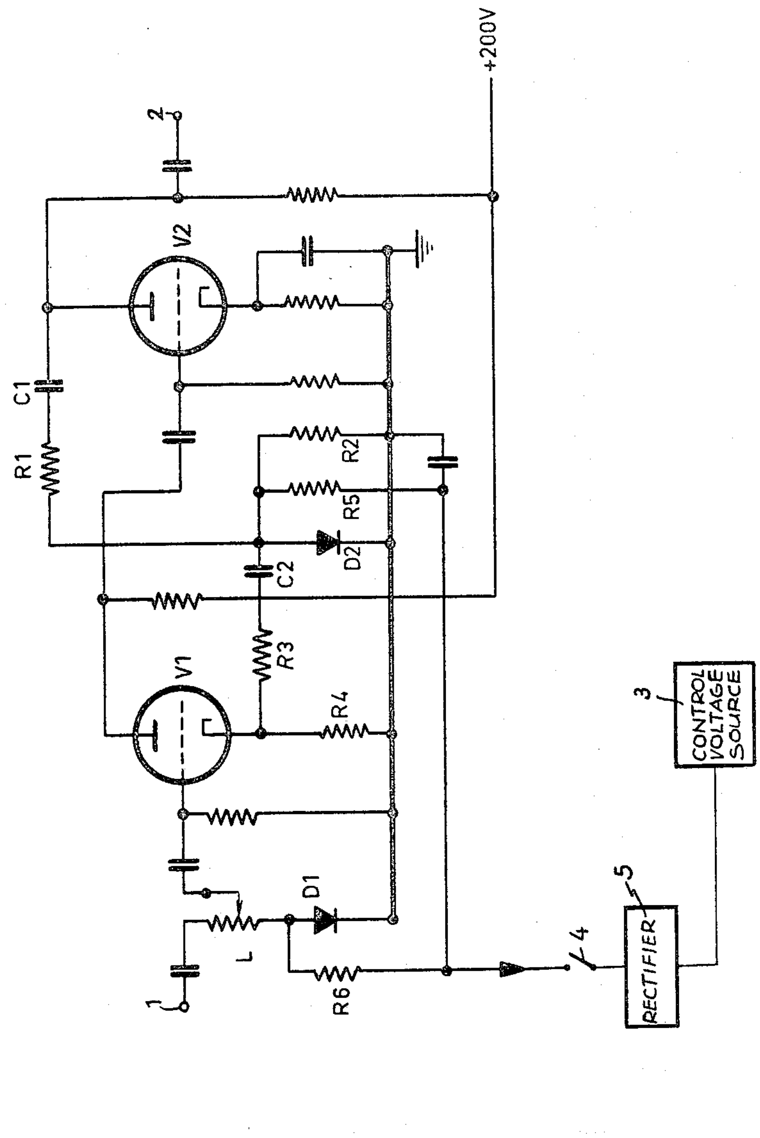
INVENTOR
FRIEDRICH KNOCHENHAUER
BY
ATTORNEY 3,384,831
Patented May 21, 1968

1

3,384,831

SWITCHING SYSTEM FOR SWITCHING THE OPERATING MODES OF AN AMPLIFIER FOR RECORDING APPARATUS

Friedrich Knochenhauer, Altena, Germany, assignor to International Standard Electric Corporation, New York, N.Y., a corporation of Delaware Filed June 9, 1965, Ser. No. 462,511
Claims priority, application Germany, June 30, 1964, St 22,323
5 Claims. (Cl. 330—51)

This invention relates to a switching system for switching the operating modes of an amplifier for recording apparatus, and particularly to one used for magnetic tape recording apparatus.

Conventional home recorders or dictating machines have a single, common amplifier which is used for both recording and playback. During recording, a microphone, or other pickup, or the output of a broadcast receiver, or the like, is applied to the input of the recording amplifier, and the amplifier output is connected to the recording element. In order to maintain an optimum signal condition at the amplifier, it is necessary to control amplifier gain to compensate for different input signal voltages. Customarily this is done with the aid of a potentiometer in the first or second amplifier stage. During the recording a high frequency output from an R.F. generator is simultaneously introduced to erase or premagnetize the tape. In playback, the pickup head output is applied to the input of the amplifier, and the amplifier output is connected to an output stage. In the case of playback also the amplifier corrects the frequency response characteristic resulting from inductive effects, self-demagnetisation of tape, and the gap function of the head. The switch-over of the amplifier, then, from recording to playback, as well as the switching on of the correction, is accomplished in almost all cases by means of relays or manually operated hand- or key-switches.

In order to simplify the manipulation for operation of sound recording and dictating machines, it is necessary to make the playback sound volume control independent of the position of the recording volume control. Otherwise the playback volume would always be dependent upon the recording signal condition. To overcome this, two volume controls are required, one for recording and one for playback. Then, the recording volume control is disconnected during the playback; playback volume is adjusted by a control arranged immediately ahead of the output stage. If the recording volume regulator is not disconnected the volume would be controllable at two points and this would be confusing to users of the machines.

In prior art, the switch-over of the amplifier from recording to playback, with the alternate disabling and enabling of recording or playback volume controls, requires a number of switchover contacts. In many cases the number of contacts are greater than can be accommodated on one relay.

An object of this invention is to provide an improved switching system for switching the operating modes of an amplifier for recording apparatus, particularly for a home recorder or ditcating machine.

Another object of this invention is to effect a saving or reduction of the number of switch-over contacts in such a system.

A feature of this invention is to provide a switch-over arrangement for the common amplifier of a home recorder or dictating machine which uses the high frequency signal, from an R.F. generator tape-erasing or premagnetizing means, to operate the switching means.

2

According to this invention switching diodes are connected in the recording volume control circuit, and the negative feedback circuit. Depending upon the mode of operation, a control voltage is either introduced or withheld to cause the diodes to conduct or not conduct. When the diodes conduct, the recording volume control is effective and the negative feedback circuit is inoperative. Thus, the amplifier is enabled for recording purposes. When the diodes are non-conductive, the recording volume control is ineffective, and the feedback circuit is connected; thus, the amplifier is enabled for playback. (Playback volume control, not shown and not germane to this invention, would be arranged immediately ahead of an output stage.)

The above-mentioned and other features and objects of this invention will become more apparent by reference to the following description take in conjunction with the accompanying drawing which illustrates a two-stage tube-type amplifier, in block- and schematic-diagram form, representing an embodiment of the inventive concept. Terminal 1 is the input point for the audio or other signal. The signal is fed through the volume control potentiometer L to the grid of V1. The signal is amplified and fed from the plate of V1 to the grid of V2 for final amplification. Amplified signal output, then, is fed to output terminal 2. Capacitors C1 and C2, and resistors R1, R2, R3, and R4 comprises a negative feedback network. With the associated plate load resistors, and interstage coupling components, a known two-stage amplifier is thus illustrated. The inventive elements are represented by diodes D1 and D2 resistors R6 and R5, and an input means for a control voltage shown as blocks 3 and 5, and switching means 4. Diode D1, the the ground lead of the volume control L, across R6, a high-ohmic resistor, is capable of being blocked and unblocked. In the same way, diode D2 is arranged in the feedback network, across resistor R5, for conducting or non-conducting modes.

Diode control voltage may be fed in from a high-frequency generator or a negative D.C. source 3, via a change-over contact or switch 4, or via a means most complementary to sound recording and dictating machines. In the latter the high frequency signal used to pre-magnetize or erase the tape can be rectified, passed through a rectifier 5 as shown in the present embodiment, and used as the control voltage. Further, this high-frequency signal, if it is of an order beyond the transmission range of the amplifier, can be fed in directly, without rectification, as the control voltage.

As can be seen, by reference to the drawing, the control voltage causes diodes D1 and D2 to conduct. This conduction retains the effectivity of the recording volume control L and shorts the negative feedback network to ground. With the removal of a control voltage, diodes D1 and D2 switch to the non-conducting state and disable the recording volume control L and re-establish the effectivity of the negative feedback network. In the former status, the amplifier is set to handle the recording mode of operation, and potentiometer L functions as the *recording* volume control. In the latter status the amplifier is in condition to handle the playback mode of operation; a not-shown volume control provides for adjustment of the playback signal level.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A switching system for switching the operating modes of an amplifier for recording apparatus, comprising:

an amplifier, including
a volume control, and
a negative feedback circuit;
said volume control being operative and said negative feedback circuit being inoperative during recording;
a source of control voltage;
means responsive to said control voltage for disabling said volume control and for enabling said feedback circuit; and
switching means for applying said control voltage to said disabling and enabling means during playback.

2. A switching system for switching the operating modes of an amplifier for recording apparatus, comprising:

an amplifier, including
a volume control, and
a negative feedback circuit;
said volume control being inoperative and said negative feedback circuit being operative during playback;
a source of control voltage;
means responsive to the absence of said control voltage for enabling said volume control and for disabling said feedback circuit; and
switching means for alternately applying and removing said control voltage to switch said amplifier to playback and recording modes of operation, respectively.

3. A switching system, according to claim 2, wherein:
said negative feedback circuit has frequency response characteristic correcting means; and
said enabling and disabling means include
a plurality of diodes.

4. A switching system, according to claim 3, wherein:
a first diode of said plurality is connected to said volume control; and
a second diode of said plurality is arranged in said negative feedback circuit.

5. A switching system, according to claim 3, wherein:
each diode of said plurality is conductive in the absence of said control voltage.

No references cited.

JOHN KOMINSKI, *Acting Primary Examiner.*

ROY LAKE, *Examiner.*